United States Patent [19]
Bee et al.

[11] Patent Number: 6,149,951
[45] Date of Patent: Nov. 21, 2000

[54] MANUFACTURE OF EDIBLE FROZEN PRODUCTS

[75] Inventors: Rodney David Bee; Alan John Gerrard, both of Bedford, United Kingdom

[73] Assignee: Good Humor-Breyers Ice Cream, division of Conopco, Inc., Green Bay, Wis.

[21] Appl. No.: 09/333,244

[22] Filed: Jun. 15, 1999

[30] Foreign Application Priority Data

Jun. 15, 1998 [GB] United Kingdom .................... 9812915
Mar. 18, 1999 [GB] United Kingdom .................... 9906310

[51] Int. Cl.$^7$ ............................... F25C 1/00; A23G 9/06; A23G 9/04
[52] U.S. Cl. ............................ 426/67; 426/561; 426/524; 62/1; 62/69
[58] Field of Search ................................ 426/66, 67, 524, 426/561; 62/1, 69, 70, 66

[56] References Cited

U.S. PATENT DOCUMENTS

| | | |
|---|---|---|
| 2,575,509 | 11/1951 | Bayston . |
| 2,591,990 | 4/1952 | Wisdom . |
| 2,975,603 | 3/1961 | Barnes et al. . |
| 3,086,370 | 4/1963 | Barnes et al. . |
| 3,217,053 | 11/1965 | Mitchell et al. ............................ 62/48 |
| 3,217,503 | 11/1965 | Mitchell et al. . |
| 3,220,204 | 11/1965 | Adler et al. . |
| 3,255,600 | 6/1966 | Mitchell et al. . |
| 3,333,969 | 8/1967 | Mitchell et al. . |
| 3,365,304 | 1/1968 | Guterman et al. . |
| 3,608,779 | 9/1971 | Cornelius . |
| 3,627,171 | 12/1971 | Kaplow et al. . |
| 3,939,667 | 2/1976 | Halverson . |
| 4,207,351 | 6/1980 | Davies . |
| 4,285,977 | 8/1981 | Yezek et al. . |
| 4,316,409 | 2/1982 | Adams et al. . |
| 4,333,315 | 6/1982 | Zemelman et al. . |
| 4,347,707 | 9/1982 | Zemelman et al. . |
| 4,393,660 | 7/1983 | Kleiner et al. . |
| 4,398,394 | 8/1983 | Kleiner et al. . |
| 4,398,395 | 8/1983 | Hinman et al. . |
| 4,404,807 | 9/1983 | Zemelman et al. . |
| 4,487,023 | 12/1984 | Hegadorn et al. . |
| 4,738,862 | 4/1988 | Bee . |
| 4,930,319 | 6/1990 | Bee et al. . |
| 4,934,153 | 6/1990 | Ebinuma et al. . |
| 5,044,164 | 9/1991 | Bee . |
| 5,055,315 | 10/1991 | Bee . |
| 5,404,727 | 4/1995 | Baker et al. . |
| 5,473,904 | 12/1995 | Guo et al. . |
| 5,487,493 | 1/1996 | McNabb . |
| 5,523,111 | 6/1996 | Nickel et al. . |
| 5,536,893 | 7/1996 | Gudmundsson . |
| 5,538,745 | 7/1996 | Tapfer et al. . |
| 5,562,891 | 10/1996 | Spencer et al. . |
| 5,698,247 | 12/1997 | Hall . |
| 5,738,889 | 4/1998 | Bee . |
| 6,028,234 | 2/2000 | Heinemann et al. . |

FOREIGN PATENT DOCUMENTS

| | | |
|---|---|---|
| 0 330 578 A2 | 8/1989 | European Pat. Off. . |
| 0 330 578 A3 | 8/1989 | European Pat. Off. . |
| 0 336 501 | 10/1989 | European Pat. Off. . |
| 0 355 875 | 2/1990 | European Pat. Off. . |
| WO 94/02414 | 2/1994 | WIPO . |

*Primary Examiner*—Cynthia L. Nessler
*Attorney, Agent, or Firm*—James J. Farrell

[57] ABSTRACT

A simple, inexpensive method of producing a gas hydrate is provided comprising the steps: (i) filling a vessel with an amount of liquid water and/or frozen water, (ii) adding an amount of condensed hydrate forming gas to the vessel in a manner such that the condensed gas does not come into contact with liquid water, (iii) contacting the condensed gas, and/or its' sublimation or liquification products at a suitable pressure with the liquid and/or frozen water mixture to produce a reaction mixture, and keeping the reaction mixture at, or below, the maximum temperature at which the gas hydrate is stable and at a suitable pressure for a sufficient time to produce the gas hydrate.

14 Claims, 1 Drawing Sheet

MANUFACTURE OF EDIBLE FROZEN PRODUCTS

The invention relates to the manufacture of frozen products and more precisely to the manufacture of edible solid gas hydrates for use in food products.

Various methods for manufacturing gas hydrates are known, for example, U.S. Pat. No. 4,347,707, U.S. Pat. No. 4,487,023 and U.S. Pat. No. 3,217,503.

WO 94/02414 (EP 651 727) discloses a method for the manufacture of solid gas hydrates where an aqueous liquid as a continuous phase, having the hydrate forming gas dissolved therein, is cooled to a sufficiently low temperature to form the solid gas hydrate.

All the above disclosed methods require either careful control of the reaction conditions or, more importantly, complicated and expensive equipment or conditions. In the methods of the aforementioned US patents the composition of the final product cannot easily be pre-determined, in particular, not for higher gas contents.

Conventionally a liquefied or gaseous hydrate forming gas, e.g. $CO_2$, is used in the preparation of gas hydrates and well-known safety and technical problems then need to be addressed.

The present invention addresses these problems by providing a method for the manufacture of solid gas hydrates, requiring only a simple pressure vessel and utilisation of commonly existing freezing facilities. The solid gas hydrates are of particular use in frozen food products.

Accordingly, the invention provides a method of producing a gas hydrate comprising the steps:

(i) filling a vessel with an amount of liquid water and/or frozen water, (ii) adding an amount of condensed hydrate forming gas to the vessel in a manner such that the condensed gas does not come into contact with liquid water, (iii) contacting the condensed gas, and/or its' sublimation or liquification products at a suitable pressure with the liquid and/or frozen water mixture to produce a reaction mixture, and keeping the reaction mixture at, or below, the maximum temperature at which the gas hydrate is stable and at a suitable pressure for a sufficient time to produce the gas hydrate.

Also provided by the present invention is a gas hydrate produced by the method of the invention.

The method of the present invention provides several advantages not previously associated with the manufacture of solid gas hydrates. These advantages include low cost, the flexibility to manufacture on a large or small scale, and/or full or partial automation or manual operation (even by one person). Furthermore the products have a high activity i.e. large volumes of gas per unit weight.

Thus the present invention provides an effective, yet surprisingly simple, method of producing gas hydrates by the use of condensed hydrate forming gases, e.g. solid $CO_2$. This makes the process much easier to control and carry out. The advantages above were not hitherto provided because of the difficulties involved in handling gaseous gases as conventionally used.

Ingredients and product

Figure 1:
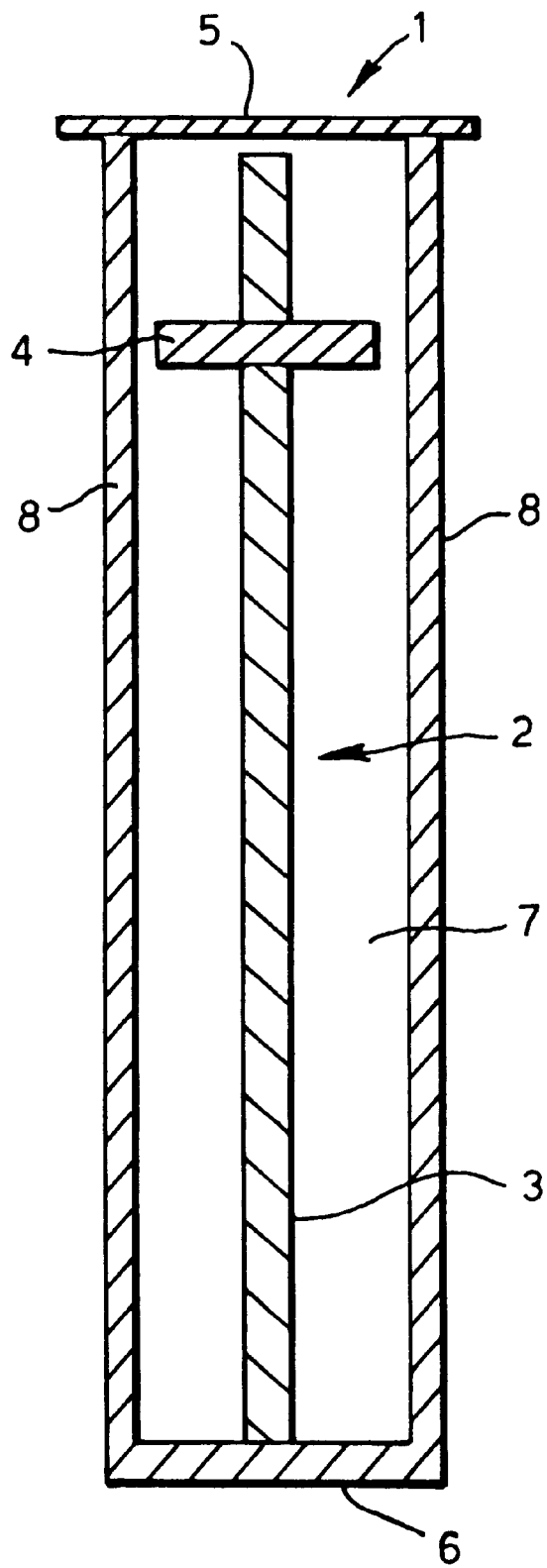
FIG. 1 shows a reaction vessel for use in the second embodiment of the method of the present invention.

The gas hydrate produced may be any that may be made by the method, in particular, $CO_2$ gas hydrate. It is especially preferred if the gas hydrate comprises $CO_2$ gas hydrate. The condensed hydrate forming gas used corresponds to the gas hydrate to be produced. Preferably, the condensed hydrate forming gas comprises $CO_2$.

Water is used in the method of the present invention. Preferably purified, or pure, water is used. The water may be added to the vessel either as liquid water and/or frozen water. Preferably a mixture of liquid and frozen water is added to the vessel but it is possible to add only frozen water to the vessel and let it fully or partially melt. Alternatively only liquid water may be added and the water can be fully or partially frozen.

Where 'gas hydrate' is referred to herein this includes gas hydrate/ice composites within this term.

The condensed hydrate forming gas is used in the present method in the form that it exists at atmospheric pressure. For example condensed carbon dioxide exists in the solid form at atmospheric pressure and so is used in this form. References to condensed hydrate forming gas herein are to be construed accordingly. Typically the condensed hydrate forming gas will be in the solid state.

The method of the invention will be described in more detail below with reference to steps (i) to (iv). It will be understood that within the present invention one or more of the following steps may occur concurrently or that possibly the order of steps (i) and (ii) may be reversed.

Step (i)

In the first step of the method, the vessel is filled with an amount of liquid water and/or frozen water. Any suitable method, e.g. metered dose, pouring, filling by weighing etc. may be used.

In a preferred embodiment the vessel is filled with a mixture of liquid water and frozen water so that the latter floats on the surface of the former. Preferably, before the condensed hydrate forming gas is added to the vessel, the vessel contains a mixture of 10–80% by weight of frozen water in liquid water based on the total amount of water, preferably 20–40%, e.g. 25–40% based on the total amount of water.

If a mixture of liquid water and frozen water is used the proportions of liquid water to frozen water (expressed as the above % by weight) may be controlled to have the appropriate heat content so that the vessel will equilibrate at a temperature at which at least substantially all the gas hydrate has been formed and at least substantially all the ice has been consumed. In other words, the reaction in the vessel is largely self-heat regulating when the level of ice is controlled within the limits stated herein. The desired ratio of liquid water:frozen water is obtained by using the above % by weight of frozen water in liquid water.

In one embodiment of the invention powdered, finely divided or granular condensed hydrate forming gas, eg solidified $CO_2$, is added to the vessel containing liquid water and frozen water. Powdered condensed hydrate forming gas is preferred. An ice-plug is thus formed across the surface of the liquid water by the action of the solidified gas upon ice floating on the water and forms an at least substantially complete barrier across the cross section of the vessel. The ice-plug is ideally formed as a solid 'plug' of ice extending over the total cross section of the vessel. The ice-plug could also be formed by other methods.

The 'ice-plug barrier' described above is one method of achieving physical separation of the liquid water and condensed hydrate forming gas as required in step (ii). Other suitable methods of achieving the separation may be used and some other suitable methods are described below under step (ii).

"Filling" as used herein does not necessarily describe where the vessel is filled to capacity. Usually the vessel is filled to 65–90% of its' volume, for example, 75–90% of its' volume.

The vessel may alternatively be filled with only frozen water in step (i) so that the use of a condensed hydrate forming gas to form the ice plug is not required.

Usually the amount of liquid and/or frozen water is predetermined prior to filling of the vessel so that the exact amount of each ingredient is added. Alternatively a first calculated amount of an ingredient may be added and the amount of the second ingredient calculated accordingly.

Step (ii)

In the second step an amount of a condensed hydrate forming gas is added to the vessel in a manner such that liquid water and the condensed hydrate forming gas do not come into contact i.e. are physically separated. It is to be noted that the order of step (i) and (ii) may be reversed, where water only in the frozen state is added to the vessel. Thus, the condensed hydrate forming gas may, in practice, be added before, during or after step (i).

The physical separation of the liquid water and condensed gas (when it is in a solid form) may be achieved by any suitable method. Suitable methods include e.g. using a vessel with a stepped internal diameter in conjunction with a block of condensed hydrate forming gas (e.g. solid $CO_2$), or, fixing a block of condensed hydrate forming gas, (e.g. solid $CO_2$), to the vessel lid, or providing shelves in the vessel above the level of the water.

In one preferred embodiment the condensed hydrate forming gas, is added into the vessel, preferably as pellets, to lie on an ice plug (formed in the first step) so contact with liquid water is avoided until required. Preferably the ice plug has liquid water on one side and the condensed hydrate forming gas on the other so the two ingredients do not come into contact until the ice-plug melts or in some other way looses its' integrity.

In another embodiment the separation may be obtained by using a platform comprising a shelf and a supporting column wherein the shelf is supported by the supporting column which extends from the base of the vessel to above surface of the water (whether it is a liquid, frozen or mixture thereof) in the vessel. The shelf lies above the surface of the water when the vessel is upright. The platform comprises a supporting column detachable from the base of the vessel. Preferably the shelf is concentric with the supporting column or is placed so as to rest on the apex of the column. The outer edge (cross-section) of the shelf may be any. suitable shape, although to provide an effective physical barrier, it is preferred that the shelf has a cross sectional shape substantially consistent with that of the inner surface of the vessel sides. However there must be a sufficient gap between the shelf edge and the vessel inner surface to allow adequate mixing of the reaction mixture. The supporting column may extend above the shelf to the lid of the vessel when the vessel is upright. In a preferred type of vessel the supporting column is preferably centrally placed in the vessel cavity and extends from the base of the vessel to the lid. The platform can be made of any suitable material but is preferably a flexible material that is easily detached from the gas hydrate product (eg polytetrafluorethylene (PTFE)). The platform must be detachable from the vessel to allow for effective removal of the product.

According to this embodiment the supporting column preferably provides a central annulus to the reaction vessel. This provides the advantage of reduced processing time.

Before, during, or after, the condensed hydrate forming gas is added, in any method of carrying out the second step, an amount of pre-formed gas hydrate product may be added to induce nucleation of the gas hydrate product. Preferably, finely divided, powdered or granular pre-formed gas hydrate product is added onto the ice plug formed in the first step. The pre-formed gas hydrate product may be added at any time before the condensed hydrate forming gas and liquid water are brought into contact. Preferably the pre-formed hydrate product is added to the ice-plug before it melts.

The condensed hydrate forming gas and pre-formed gas hydrate product (if used) are supported by the ice plug or platform shelf, and are kept physically separate from the liquid water. This allows the safe sealing of the vessel as the two components of the gas hydrate product have not yet been brought into intimate contact.

The ingredients are usually added at atmospheric pressure.

The ratio by weight of condensed hydrate forming gas: total frozen and liquid water is preferably in the range 1:2.35 to 1:11, preferably 1:3 to 1:10, eg 1:4 to 1:7, such as 1:5.5 for the preparation of $CO_2$ gas hydrate. This corresponds to mole ratios for $CO_2$: water of 1:5.75 to 1:26.9, preferably 1:7.33 to 1:24.5, eg 1:9.8 to 1:17.1, such as 1:13.4.

For other condensed hydrate forming gases the mole ratio of solidified gas to total frozen and liquid water is as above for $CO_2$.

$CO_2$ gas hydrate has the so called structure I (SI). The above mole ratios apply for making other SI gas hydrates by this method. The so-called structure II (SII) gas hydrates can be prepared by using mole ratios of gas:water/ice that take account of the stoichiometry of SII gas hydrates.

At the end of the second step, the vessel is sealed from the atmosphere before being pressurised (usually by self—pressurisation as the solid $CO_2$ sublimes and, at the appropriate temperature and pressure, it melts and boils).

Step (iii)

In the third step, liquid water and the condensed hydrate forming gas and/or its sublimation or liquification products are allowed or caused to come into contact to form the reaction mixture. Most preferably this occurs at a temperature at, or below, the maximum temperature at which the gas hydrate is stable.

The contacting to form the reaction mixture may be effected either by contacting the condensed gas and/or its sublimation products either with liquid water only or with an ice/liquid water mixture. This includes melting of frozen water.

Where the separation of liquid water and condensed hydrate forming gas occurs by use of an ice-plug, the ice plug may be melted by any suitable means, e.g. by heated jacket, warm air, warm water etc., to bring the liquid water and condensed gas into contact. The melting can be localised or occur by general application of the melting means. If the condensed hydrate forming gas is supported on a platform shelf the requirement to melt an ice plug is avoided. In practice an ice-film (which is not as thick as an ice-plug) will form across the vessel because of the conditions within it. However, this is easily melted.

The reaction mixture may be mixed by any suitable means including rotating or rocking the vessel about its axis or vertical axis.

The reaction to produce the gas hydrate typically starts to occur in the third step of the method. The temperature of the reaction mixture in the vessel should not exceed the maximum temperature at which the gas hydrate is stable and is preferably in the range of 0° C.–5° C., preferably 0° C.–2° C.

The temperature of the reaction mixture is kept at or below the maximum temperature at which the gas hydrate is stable for a sufficient time to produce the gas hydrate. Freezing, or further cooling, the mixture is usually necessary.

The temperature of the reaction mixture may be lowered to below the maximum temperature at which the gas hydrate is stable by any suitable means of heat withdrawal, e.g. by water bath or cooling jacket comprising cooling liquid such as brine and/or glycol, or evaporating liquid e.g. ammonia if a jackette vessel is used or conventional refrigeration (e.g. cold store) or any conventional freezing method (eg blast freezer).

Typically the gas hydrate product will be formed by subjecting the reaction mixture to quiescent freezing by placing the vessel in a freezer e.g. a blast freezer.

Removal of the product

The totally solidified gas hydrate product may be removed from the vessel by any suitable means, for example, heat can be applied to the outer surface of the vessel to melt the part of the product in contact with a warmed part of the vessel thereby aiding removal. Suitable means to facilitate removal include the application of hot water, hot air or heated jackets to the reaction vessel. Alternatively the product may be removed manually or mechanically from the vessel.

Optional ingredients

The edible gas hydrate product may be prepared so as to include minor amounts of conventional frozen confectionery product ingredients such as flavourings, colourings etc.

Vessel

The vessel may be any suitable vessel capable of withstanding the increases in pressure that occur during the reaction to form the gas hydrate product, preferably, a pressure vessel. It is especially preferred if the vessel is free-standing and of a suitable size and shape that it can be filled, manoeuvred and emptied manually, for example, by one person. A suitable vessel, and one which is particularly preferred, has an elongated reaction chamber e.g. a substantially cylindrical reaction chamber formed by a vessel having long, narrow parallel sides. It is advantageous in terms of the cost of the pressure vessel if it is substantially cylindrical. The vessel, to optimise the surface area for cooling and nucleation of the reactions and to minimise costs preferably has a high ratio of internal length to internal diameter in the range 3:1 to 20:1, preferably 7:1 to 20:1, most preferably between 10:1 and 15:1.

Although substantially cylindrical vessels are preferred for cost reasons also encompassed by "substantially cylindrical" are internally up to 20% tapering pressure vessels, with the base, having a smaller internal diameter than the internal diameter of the vessel at its lid end.

The vessel may be fitted with wheels (or the like) to enable movement, and, it is preferably capable of being oriented through different attitudes e.g. from vertical to horizontal. This change of orientation may be achieved by any suitable means e.g. by winch, handles, or any suitable automated means. Typically the vessel has a lid, or other suitable closure means, that can be tightened or loosened as necessary e.g. by bolts.

FIG. 1 shows a reaction vessel for use in the second embodiment of the method of the present invention. The vessel (1) has parallel sides (8), a detachable lid (5), a base (6) and a platform (2) arranged centrally in the reaction vessel cavity (7). The platform (2) comprises a supporting column (3) that extends upwards from the base (6) when the vessel is upright. A shelf (4) is located on the column (3) at a suitable distance away from the base (6) so that the shelf (4) is above the water located at the base (6) of the vessel (1) when the vessel is upright during use. The outer cross section of the shelf (4) is preferably substantially consistent with the internal cross section of the reaction vessel sides (8). Preferably that the shelf (4) is substantially horizontal. Preferably the column (3) is arranged to provide an annular space in the product.

A variation of the vessel shown in FIG. 1 has the platform (2) comprising the supporting column (3) and the shelf (4) arranged as in FIG. 1 but the supporting column (3) does not extend above the shelf (4) when the vessel is upright.

An alternative form for the vessel is one wherein it is angled, or bent, so that it is substantially V-shaped or C-shaped. However in practice this form of vessel has been found to be less preferred than the vessel described above as they are more difficult to remove the product from.

The method of the invention is inexpensive, simple and can be fully or partly automated. Any part of the method may be automated if desired.

EXAMPLES

The method of the present invention will be further illustrated by the following example. Further examples and modifications, falling within the scope of the present invention, will be apparent to the skilled person. Having generally described the invention, the following examples elucidating the preparation of $CO_2$ hydrate will be described to illustrate the method of the invention that may also be applied to produce other desirable gas hydrates as well.

The following examples also demonstrate the claimed product.

Example 1 ice plug separation method

An gas hydrate/ice composite product was produced as follows:

Into a cylindrical pressurised vessel (mounted into a support on wheels), 7 kg of pure water and 4 kg of ice were added so the vessel contained a mixture of ice and water containing approximately 36% ice (before any ice melted). The ice floated to the top of the water.

The floating ice was hardened by sprinkling onto it powdered solid $CO_2$ (100 g) to lower the temperature of the ice and to form a firm ice plug across the surface of the water.

A further 2 kg of solid $CO_2$ was added into the vessel. The solid $CO_2$ was kept separate from the liquid water beneath by the ice-plug and so no reaction, at this point, took place between the solid $CO_2$ and the liquid water. Powdered $CO_2$ gas/ice composite hydrate product (100 g), taken from a previous preparation, was sprinkled onto the solid $CO_2$ to ensure nucleation of the gas hydrate phase.

The pressure vessel lid was put in place and secured by nuts tightened to the desired torque using an air tool. The vessel was sealed (by closing a tap on the lid) and manually moved from a vertical to a horizontal position by turning the vessel through 90 degrees so it rested on its' wheels.

Subliming $CO_2$ cooled the part of the vessel containing the $CO_2$ (i.e. the part that was the "upper" part when the vessel was filled). The melting $CO_2$ produced rapid cooling and soon the vessel contained liquid $CO_2$ at what was the top of the vessel when filed, an ice plug, and liquid water in what was the base of the vessel.

The mixing of the liquid $CO_2$ and liquid water was allowed to start by melting the ice plug by the application of warm running water to the outside of the vessel. The vessel (which was balanced about its' centre of gravity) was manually rocked gently to provide sufficient agitation to mix the contents. At this stage the vessel contained a suspension principally of $CO_2$ gas hydrate crystals in water.

The vessel was allowed to stand for several minutes and was then taken to a blast freezer to freeze the contents. The vessel was left at −35 C for 4 hours to allow the contents to freeze. When the contents had been given sufficient time to freeze the pressurised vessel was removed from the freezer and excess pressure in the vessel was released through a pressure release tap before the lid was loosened.

The opened vessel was returned to a near vertical position, but, with the end having the lid facing downwards to allow removal of the frozen product. The gas hydrate product was removed from the vessel by running warm water over the outside of the vessel so the product was melted out by melting the portion of the product in contact with the vessel.

The ratio of solid $CO_2$:water plus ice initially put in the vessel, was chosen to produce the desired carbon dioxide content of the gas hydrate/ice composition product i.e. in mls $CO_2$ $g^{-1}$.

The ratio of water:ice was selected to give the correct heat content to drive the reaction to completion.

The carbon dioxide content of the product was 55 mls $CO_2$ $g^{-1}$ of composite. Gas hydrate/ice composites produced using only dissolved $CO_2$ typically contain up to 25 mls $CO_2$ $g^{-1}$. Thus the method of Example 1 produces gas hydrate having a carbon dioxide content greater than a method using only dissolved gas.

Example 2 platform separation method

Example 1 was repeated but using the cylindrical pressurised vessel of Example 1 modified to contain a platform comprising a supporting column and a shelf as shown in FIG. 1. By using the vessel of FIG. 1 an annular ingot of gas hydrate/ice composite product is obtained.

The ice and water mixture of Example 1 was added to the vessel to a level that was below the shelf of the platform when the vessel was upright.

Solid $CO_2$ was added into the vessel on the platform so that it did not contact any liquid or frozen water. Powdered pre-formed $CO_2$ gas hydrate product was sprinkled into the solid $CO_2$ on the platform as in example 1.

The vessel was closed and the reaction mixture formed and mixed as for example 1.

The freezing method and gas hydrate product removal followed the method of example 1.

The method of example 2 produced an edible gas hydrate having equivalent carbon dioxide to that of example 1. Example 2 was found to be particularly advantageous in terms of the freezing time required whilst still providing an acceptable amount of product per batch.

What is claimed is:

1. A method of producing a gas hydrate comprising the steps;
    (i) filling a vessel with an amount of liquid water and/or frozen water,
    (ii) adding an amount of condensed hydrate forming gas to the vessel in a manner such that the condensed gas does not come into contact with liquid water,
    (iii) contacting the condensed gas, and/or its' sublimation or liquification products at a suitable pressure with the liquid and/or frozen water mixture to produce a reaction mixture, and keeping the reaction mixture at, or below, the maximum temperature at which the gas hydrate is stable and at a suitable pressure for a sufficient time to produce the gas hydrate.

2. A method according to claim 1 wherein the condensed hydrate forming gas comprises solidified carbon dioxide.

3. A method according to either claim 1 wherein step (i) comprises filling the vessel with an amount of liquid water and frozen water and adding thereto an amount of powdered, finely divided or granular condensed hydrate forming gas to form an ice-plug over the liquid water.

4. A method according to claim 3 wherein in step (ii) an amount of condensed hydrate forming gas is added onto the ice plug formed in step (i).

5. A method according to claim 1 wherein step (iii) comprises melting an ice-plug to contact the liquid water and condensed hydrate forming gas, and/or its' sublimation/liquification products, to form a reaction mixture.

6. A method according to claim 1 wherein in step (ii) an amount of condensed hydrate forming gas is added to the vessel by being placed upon a detachable platform above the level of the frozen water and/or liquid water in the vessel.

7. A method according to claim 1 wherein powdered, finely divided or granular pre-formed gas hydrate is added to the vessel in step (ii).

8. A method according to claim 1 wherein the condensed hydrate forming gas is added to the vessel containing a mixture of 10–80 wt % frozen water in liquid water.

9. A method according to claim 1 further comprising step (iv) freezing the reaction mixture.

10. A method according to claim 9 wherein the freezing occurs by placing the vessel in a blast freezer.

11. A method according to claim 1 wherein condensed hydrate forming gas is $CO_2$ and the ratio by weight of condensed $CO_2$: total frozen and liquid water in step (ii) is between 1:2.35 to 1:11.

12. A method according to claim 11 wherein the mole ratio of condensed $CO_2$ to total frozen and liquid water is 1:5.75 to 1:26.9.

13. A method according to claim 1 wherein the vessel has an elongated reaction chamber.

14. A method according to claim 13 wherein the vessel is a pressure vessel.

* * * * *